(12) United States Patent
Wang

(10) Patent No.: US 10,568,096 B2
(45) Date of Patent: Feb. 18, 2020

(54) METHOD FOR TRANSMITTING LTE-U CARRIER INFORMATION, BASE STATION, AND USER EQUIPMENT

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 15/518,444

(22) PCT Filed: Oct. 11, 2014

(86) PCT No.: PCT/CN2014/088335
§ 371 (c)(1),
(2) Date: Apr. 11, 2017

(87) PCT Pub. No.: WO2016/054814
PCT Pub. Date: Apr. 14, 2016

(65) Prior Publication Data
US 2017/0318585 A1 Nov. 2, 2017

(51) Int. Cl.
*H04L 5/00* (2006.01)
*H04L 27/26* (2006.01)
(Continued)

(52) U.S. Cl.
CPC .......... *H04W 72/0453* (2013.01); *H04L 1/18* (2013.01); *H04L 5/0005* (2013.01); *H04L 5/0053* (2013.01); *H04L 27/2601* (2013.01)

(58) Field of Classification Search
CPC ............. H04W 72/0453; H04L 5/0005; H04L 5/0053; H04L 27/2601
See application file for complete search history.

(56) References Cited

U.S. PATENT DOCUMENTS 8,634,358 B2* 1/2014 Damnjanovic ....... H04L 1/1861
370/329
9,503,918 B2* 11/2016 Han ...................... H04L 5/0098
(Continued)

FOREIGN PATENT DOCUMENTS

CN 102917456 A 2/2013
CN 103179665 A 6/2013
(Continued)

OTHER PUBLICATIONS

"PHICH resource allocation in LTE-A," 3GPP TSG-RAN WG1 #61bis Dresden, Germany, R1-104075, pp. 1-6, 3rd Generation Partnership Project, Valbonne, France (Jun. 28-Jul. 2, 2010).

*Primary Examiner* — Rasheed Gidado
(74) *Attorney, Agent, or Firm* — Leydig, Voit & Mayer, Ltd.

(57) ABSTRACT

Embodiments of the present invention provide a method for transmitting Long Term Evolution in unlicensed spectrum LTE-U carrier information, a base station, and user equipment. The method includes: determining, by a base station, a physical hybrid automatic repeat request indicator channel PHICH resource; using, by the base station, the PHICH resource to indicate the LTE-U carrier information; and sending, by the base station to user equipment, the PHICH resource that indicates the LTE-U carrier information. In the embodiments of the present invention, network signaling overheads can be reduced.

20 Claims, 3 Drawing Sheets

(51) Int. Cl.
*H04L 1/18* (2006.01)
*H04W 72/04* (2009.01)

(56) References Cited

U.S. PATENT DOCUMENTS

| | | |
|---|---|---|
| 9,826,480 B2* | 11/2017 | Damnjanovic ... H04W 52/0216 |
| 9,917,676 B2* | 3/2018 | Ng ........................ H04L 1/1812 |
| 2011/0176502 A1 | 7/2011 | Chung et al. |
| 2012/0039286 A1* | 2/2012 | Okubo .................. H04L 1/1861 |
| | | 370/329 |
| 2012/0069802 A1* | 3/2012 | Chen ....................... H04L 5/001 |
| | | 370/329 |
| 2012/0220327 A1* | 8/2012 | Lee ................... H04W 72/1273 |
| | | 455/509 |
| 2012/0264468 A1 | 10/2012 | Turtinen et al. |
| 2014/0029486 A1* | 1/2014 | Li ......................... H04L 5/1469 |
| | | 370/280 |
| 2014/0148191 A1 | 5/2014 | Feng et al. |
| 2014/0204854 A1 | 7/2014 | Freda et al. |
| 2014/0241303 A1* | 8/2014 | Yoon .................. H04L 27/2613 |
| | | 370/329 |
| 2015/0131536 A1 | 5/2015 | Kaur et al. |
| 2015/0223075 A1* | 8/2015 | Bashar .................. H04W 16/14 |
| | | 370/329 |

FOREIGN PATENT DOCUMENTS

| | | |
|---|---|---|
| CN | 103370896 A | 10/2013 |
| CN | 103825638 A | 5/2014 |
| WO | 2012078565 A1 | 6/2012 |
| WO | 2013131268 A1 | 9/2013 |

\* cited by examiner

METHOD FOR TRANSMITTING LTE-U CARRIER INFORMATION, BASE STATION, AND USER EQUIPMENT

CROSS-REFERENCE TO RELATED APPLICATIONS

This application is a national stage of International Application No. PCT/CN2014/088335 filed Oct. 11, 2014, which is hereby incorporated by reference in its entirety.

TECHNICAL FIELD

The present invention relates to the communications field, and more specifically, to a method for transmitting Long Term Evolution in unlicensed spectrum (English full name: Unlicensed spectrum Long Term Evolution, LTE-U for short) carrier information, a base station, and user equipment.

BACKGROUND

Spectra used in a prior-art wireless communications system are classified into two categories: a licensed spectrum (English: licensed spectrum) and an unlicensed spectrum (English: unlicensed spectrum). Any operator can deploy a device on an unlicensed frequency band, for example, deploying a wireless fidelity (English full name: wireless fidelity, WiFi for short) device on a 2.4 GHz frequency band and a 5 GHz frequency band.

In the prior art, LTE-U carrier information is generally transmitted by using downlink control information (English full name: Downlink Control Information, DCI for short) signaling. However, as user equipments in a wireless communications system increase, if DCI signaling is sent to each user equipment for transmitting LTE-U carrier information, there is an overlarge amount of signaling that needs to be processed in the wireless communications system.

SUMMARY

Embodiments of the present invention provide a method for transmitting LTE-U carrier information, a base station, and user equipment that can be used to reduce an amount of signaling that needs to be processed in a wireless communications system.

According to a first aspect, a method for transmitting Long Term Evolution in unlicensed spectrum LTE-U carrier information is provided, including: determining, by a base station, a physical hybrid automatic repeat request indicator channel PHICH resource; using, by the base station, the PHICH resource to indicate the LTE-U carrier information; and sending, by the base station to user equipment, the PHICH resource that indicates the LTE-U carrier information.

With reference to the first aspect, in a first possible implementation manner of the first aspect, the determining, by a base station, a PHICH resource includes: determining, by the base station, a PHICH group number $n\_u_{PHICH}^{group}$ of the PHICH resource and an orthogonal sequence number $n\_u_{PHICH}^{seq}$ in the PHICH group $n\_u_{PHICH}^{group}$.

With reference to the first possible implementation manner of the first aspect, in a second possible implementation manner of the first aspect, the method further includes: sending, by the base station to the user equipment, the PHICH group number $n\_u_{PHICH}^{group}$ of the PHICH resource and the orthogonal sequence number $n\_u_{PHICH}^{seq}$ in the PHICH group $n\_u_{PHICH}^{group}$.

With reference to the first aspect, in a third possible implementation manner of the first aspect, the determining, by a base station, a PHICH resource includes: determining, by the base station, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

With reference to the first aspect, in a fourth possible implementation manner of the first aspect, the determining, by a base station, a PHICH resource includes: determining, by the base station, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(\mathrm{LTE\text{-}U\_ID}, N_{PHICH}^{group})$ and $n\_u_{PHICH}^{seq}=\mathrm{mod}(\mathrm{LTE\text{-}U\_ID}, N_{PHICH}^{seq})$, where $\mathrm{mod}(\ )$ is a MOD function, LTE-U_ID is an LTE-U carrier identifier, $N_{PHICH}^{group}$ is a quantity of PHICH groups, and $N_{PHICH}^{seq}$ is a quantity of orthogonal sequences in each PHICH group.

With reference to the first aspect, in a fifth possible implementation manner of the first aspect, the determining, by a base station, a PHICH resource includes: determining, by the base station, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(I\_u+n\_u, N_{PHICH}^{group})+I_{PHICH}N_{PHICH}^{group}$ and $n\_u_{PHICH}^{seq}=\mathrm{mod}(\lfloor I\_u/N_{PHICH}^{group}\rfloor+n\_u, 2N_{SF}^{PHICH})$, where $\mathrm{mod}(\ )$ is a MOD function $\lfloor\ \rfloor$ is a round-down function, $N_{PHICH}^{group}$ is a quantity of PHICH groups, a value of $I_{PHICH}$ is 0 or 1, $N_{SF}^{PHICH}$ is a PHICH spreading factor with a value of 2 or 4, and n_u and I_u are adjustment parameters with a value of zero or a positive integer.

With reference to the fifth possible implementation manner of the first aspect, in a sixth possible implementation manner of the first aspect, the method further includes: sending, by the base station, n_u and I_u to the user equipment.

With reference to any one of the first aspect or the first to the sixth possible implementation manners of the first aspect, in a seventh implementation manner of the first aspect, the LTE-U carrier information includes information used to indicate a time change of an LTE-U carrier or information used to indicate whether a signal is transmitted on an LTE-U carrier.

According to a second aspect, a method for transmitting Long Term Evolution in unlicensed spectrum LTE-U carrier information is provided, including: determining, by user equipment, a physical hybrid automatic repeat request indicator channel PHICH resource, where the PHICH resource is used to indicate the LTE-U carrier information; and obtaining, by the user equipment, the LTE-U carrier information from the PHICH resource.

With reference to the second aspect, in a first possible implementation manner of the second aspect, the determining, by user equipment, a PHICH resource includes: determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$.

With reference to the second aspect, in a second possible implementation manner of the second aspect, the method further includes: receiving, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ that are sent by a base station; and the determining, by user equipment, a PHICH resource includes: determining, by the user equipment, the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are sent by the base station.

With reference to the second aspect, in a third possible implementation manner of the second aspect, the determining, by user equipment, a PHICH resource includes: determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

With reference to the second aspect, in a fourth possible implementation manner of the second aspect, the determining, by user equipment, a PHICH resource includes: determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(LTE\text{-}U\_ID, N_{PHICH}^{group})$ and $n\_u_{PHICH}^{seq}=\mathrm{mod}(LTE\text{-}U\_ID, N_{PHICH}^{seq})$, where mod( ) is a MOD function, LTE-U_ID is an LTE-U carrier identifier, $N_{PHICH}^{group}$ is a quantity of PHICH groups, and $N_{PHICH}^{seq}$ is a quantity of orthogonal sequences in each PHICH group.

With reference to the second aspect, in a fifth possible implementation manner of the second aspect, the determining, by user equipment, a PHICH resource includes: determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(I\_u+n\_u, N_{PHICH}^{group})+I_{PHICH} N_{PHICH}^{group}$ and $n\_u_{PHICH}^{seq}=\mathrm{mod}(\lfloor I\_u/N_{PHICH}^{group}\rfloor+n\_u, 2N_{SF}^{PHICH})$, where mod( ) is a MOD function, $\lfloor\ \rfloor$ is a round-down function, $N_{PHICH}^{group}$ is a quantity of PHICH groups, a value of $I_{PHICH}$ is 0 or 1, $N_{SF}^{PHICH}$ is a PHICH spreading factor with a value of 2 or 4, and n_u and I_u are adjustment parameters with a value of zero or a positive integer.

With reference to the second aspect, in a sixth possible implementation manner of the second aspect, the method further includes: receiving, by the user equipment, n_u and I_u sent by a base station, where n_u and I_u are adjustment parameters with a value of zero or a positive integer; and the determining, by user equipment, a PHICH resource includes: determining, by the user equipment, a PHICH group number $n\_u_{PHICH}^{group}$ of the physical hybrid automatic repeat request indicator channel PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(I\_u+n\_u, N_{PHICH}^{group})+I_{PHICH} N_{PHICH}^{group}$ and $n\_u_{PHICH}^{seq}=\mathrm{mod}(\lfloor I\_u/N_{PHICH}^{group}\rfloor+n\_u, 2N_{SF}^{PHICH})$, where mod( ) is a MOD function, $\lfloor\ \rfloor$ is a round-down function, $N_{PHICH}^{group}$ is a quantity of PHICH groups, a value of $I_{PHICH}$ is 0 or 1, and $N_{SF}^{PHICH}$ is a PHICH spreading factor with a value of 2 or 4.

With reference to any one of the second aspect or the first to the sixth possible implementation manners of the second aspect, in a seventh implementation manner of the second aspect, the LTE-U carrier information includes information used to indicate a time change of an LTE-U carrier or information used to indicate whether a signal is transmitted on an LTE-U carrier.

With reference to any one of the second aspect or the first to the sixth possible implementation manners of the second aspect, in an eighth implementation manner of the second aspect, the method further includes: receiving, by the user equipment, a PHICH resource that indicates the LTE-U carrier information and that is sent by the base station.

According to a third aspect, a base station is provided, including: a determining unit, configured to determine a physical hybrid automatic repeat request indicator channel PHICH resource; an indicating unit, configured to use the PHICH resource to indicate Long Term Evolution in unlicensed spectrum LTE-U carrier information; and a sending unit, configured to send user equipment the PHICH resource that indicates the LTE-U carrier information.

With reference to the third aspect, in a first possible implementation manner, the determining unit is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$.

With reference to the first possible implementation manner of the third aspect, in a second possible implementation manner, the sending unit is further configured to send the user equipment the PHICH group number $n\_u_{PHICH}^{group}$ of the PHICH resource and the orthogonal sequence number $n\_u_{PHICH}^{seq}$ in the PHICH group $n\_u_{PHICH}^{group}$.

With reference to the third aspect, in a third possible implementation manner, the determining unit is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

With reference to the third aspect, in a fourth possible implementation manner, the determining unit is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(LTE\text{-}U\_ID, N_{PHICH}^{group})$ and $n\_u_{PHICH}^{seq}=\mathrm{mod}(LTE\text{-}U\_ID, N_{PHICH}^{seq})$, where mod( ) is a MOD function, LTE-U_ID is an LTE-U carrier identifier, $N_{PHICH}^{group}$ is a quantity of PHICH groups, and $N_{PHICH}^{seq}$ is a quantity of orthogonal sequences in each PHICH group.

With reference to the third aspect, in a fifth possible implementation manner, the determining unit is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(I\_u+n\_u, N_{PHICH}^{group})+I_{PHICH}^{group}$ and $n\_u_{PHICH}^{seq}=\mathrm{mod}(\lfloor I\_u/N_{PHICH}^{group}\rfloor+n\_u, 2N_{SF}^{PHICH})$, where mod( ) is a MOD function, $\lfloor\ \rfloor$ is a round-down function, $N_{PHICH}^{group}$ is a quantity of PHICH groups, a value of $I_{PHICH}$ is 0 or 1, $N_{SF}^{PHICH}$ is a PHICH spreading factor with a value of 2 or 4, and n_u and I_u are adjustment parameters with a value of zero or a positive integer.

With reference to the fifth possible implementation manner of the third aspect, in a sixth possible implementation manner, the sending unit is further configured to send n_u and I_u to the user equipment.

According to a fourth aspect, user equipment is provided, including: a determining unit, configured to determine a physical hybrid automatic repeat request indicator channel PHICH resource, where the PHICH resource is used to indicate LTE-U carrier information; and an obtaining unit, configured to obtain the LTE-U carrier information from the PHICH resource.

With reference to the fourth aspect, in a first possible implementation manner, the determining unit is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$.

With reference to the fourth aspect, in a second possible implementation manner, the user equipment further includes a first receiving unit, configured to receive a PHICH group number $n\_u_{PHICH}^{group}$ of the PHICH resource and an orthogonal sequence number $n\_u_{PHICH}^{seq}$ in the PHICH group $n\_u_{PHICH}^{group}$ that are sent by a base station, where the determining unit is specifically configured to determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are sent by the base station.

With reference to the fourth aspect, in a third possible implementation manner, the determining unit is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

With reference to the fourth aspect, in a fourth possible implementation manner, the determining unit is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(LTE\_U\_ID, N_{PHICH}^{group})$ and $n\_u_{PHICH}^{seq}=\mathrm{mod}(LTE\_U\_ID, N_{PHICH}^{seq})$, where mod( ) is a MOD function, LTE_U_ID is an LTE-U carrier identifier, $N_{PHICH}^{group}$ is a quantity of PHICH groups, and $N_{PHICH}^{seq}$ is a quantity of orthogonal sequences in each PHICH group.

With reference to the fourth aspect, in a fifth possible implementation manner, the determining unit is specifically configured to determine a PHICH group number $n\_u_{PHICH}^{group}$ of the physical hybrid automatic repeat request indicator channel PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(I\_u+n\_u, N_{PHICH}^{group})+I_{PHICH}N_{PHICH}^{group}$ and $n\_u_{PHICH}^{seq}=\mathrm{mod}(\lfloor I\_u/N_{PHICH}^{group} \rfloor+n\_u, 2N_{SF}^{PHICH})$, where mod( ) is a MOD function, $\lfloor \; \rfloor$ is a round-down function, $N_{PHICH}^{group}$ is a quantity of PHICH groups, a value of $I_{PHICH}$ is 0 or 1, $N_{SF}^{PHICH}$ is a PHICH spreading factor with a value of 2 or 4, and n_u and I_u are adjustment parameters with a value of zero or a positive integer.

With reference to the fourth aspect, in a sixth possible implementation manner, the user equipment further includes a second receiving unit, configured to receive n_u and I_u sent by a base station, where n_u and I_u are adjustment parameters with a value of zero or a positive integer, where the determining unit is specifically configured to determine a PHICH group number $n\_u_{PHICH}^{group}$ of the physical hybrid automatic repeat request indicator channel PHICH resource and an orthogonal sequence number $n\_u_{PHICH}^{seq}$ in the PHICH group $n\_u_{PHICH}^{group}$ according to formulas $n\_u_{PHICH}^{group}=\mathrm{mod}(I\_u+n\_u, N_{PHICH}^{group})+I_{PHICH}N_{PHICH}^{group}$ and $n\_u_{PHICH}^{seq}=\mathrm{mod}(\lfloor I\_u/N_{PHICH}^{group} \rfloor+n\_u, 2N_{SF}^{PHICH})$, where mod( ) is a MOD function, $\lfloor \; \rfloor$ is a round-down function, $N_{PHICH}^{group}$ is a quantity of PHICH groups, a value of $I_{PHICH}$ is 0 or 1, and $N_{SF}^{PHICH}$ is a PHICH spreading factor with a value of 2 or 4.

With reference to any one of the fourth aspect or the first to the sixth possible implementation manners of the fourth aspect, in a seventh possible implementation manner of the fourth aspect, the user equipment further includes a third receiving unit, configured to receive a PHICH resource that indicates the LTE-U carrier information and that is sent by the base station.

Based on the foregoing technical solutions, in the embodiments of the present invention, a broadcast channel such as a PHICH is used to indicate LTE-U carrier information. All user equipments can detect and receive the LTE-U carrier information indicated by the PHICH channel, and it is not required to send DCI signaling to each user equipment for transmitting LTE-U carrier information, thereby effectively reducing network signaling overheads.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, an LTE time division duplex (Time Division Duplex, TDD), a Universal Mobile Telecommunications System (Universal Mobile Telecommunication System, UMTS), or a Worldwide Interoperability for Microwave Access (Worldwide Interoperability for Microwave Access, WiMAX) communications system.

It should be understood that, in the embodiments of the present invention, user equipment (English full name: User Equipment, UE for short) includes but is not limited to a mobile station (English full name: Mobile Station, MS for short), a mobile terminal (Mobile Terminal), a mobile telephone (Mobile Telephone), a handset (handset), a portable equipment (portable equipment), and the like. The user equipment may communicate with one or more core networks by using a radio access network (English full name: Radio Access Network, RAN for short). For example, the user equipment may be a mobile telephone (or referred to as a "cellular" phone), or a computer having a wireless communication function; the user equipment may further be a portable, pocket-sized, handheld, computer built-in, or in-vehicle mobile apparatus.

In the embodiments of the present invention, a base station may be a base station (English full name: Base Transceiver Station, BTS for short) in GSM or CDMA, or may be a base station (NodeB) in WCDMA, or may be an evolved NodeB (English full name: evolved Node B, eNB or e-NodeB for short) in LTE, which is not limited in the embodiments of the present invention.

Figure 1:
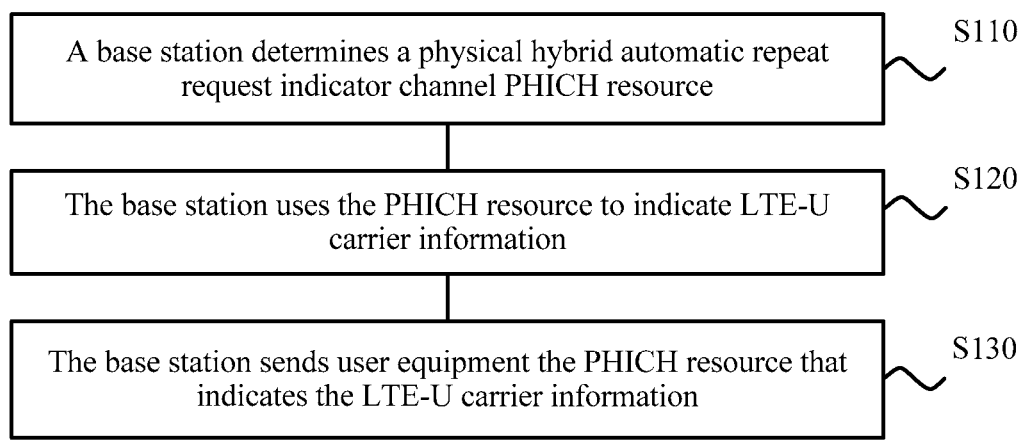
FIG. 1 is a schematic flowchart of a method for transmitting LTE-U carrier information according to an embodiment of the present invention.

FIG. 1 shows a method 100 for transmitting Long Term Evolution in unlicensed spectrum LTE-U carrier information. The method 100 may be performed by, for example, a base station. As shown in FIG. 1, the method 100 includes the following steps:

S110. The base station determines a physical automatic repeat request indicator channel PHICH resource.

In a wireless communications system, for example, an LTE system, a physical hybrid automatic repeat request indicator channel (English full name: Physical Hybrid ARQ Indicator Channel, PHICH for short) is a broadcast channel, and user equipment in the wireless communications system can detect and receive information carried on the PHICH channel.

It should be understood that the base station may determine the PHICH resource by using multiple methods. This is not limited in this embodiment of the present invention.

S120. The base station uses the PHICH resource to indicate the LTE-U carrier information.

Specifically, the base station uses the PHICH resource to indicate LTE-U carrier information of multiple user equipments.

It should be understood that the base station may use, by using multiple methods, the PHICH resource to indicate the LTE-U carrier information. This is not limited in this embodiment of the present invention.

S130. The base station sends user equipment the PHICH resource that indicates the LTE-U carrier information.

Specifically, the base station sends the multiple user equipments the PHICH resource that indicates the LTE-U carrier information of the multiple user equipments.

It should be understood that the base station may send, by using multiple methods, the user equipment the PHICH resource that indicates the LTE-U carrier information. This is not limited in this embodiment of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes in detail the method for transmitting LTE-U carrier information according to this embodiment of the present invention from a perspective of the base station with reference to FIG. 1.

The following describes this embodiment of the present invention in more detail with reference to a specific example. It should be noted that, the example in FIG. 1 is only intended to help a person skilled in the art understand the embodiments of the present invention rather than restricting the embodiments of the present invention to a specific numerical value or a specific scenario that is illustrated. Apparently, a person skilled in the art can perform various equivalent modifications or changes according to the example given in FIG. 1, and such modifications or changes also fall within the scope of the embodiments of the present invention.

According to this embodiment of the present invention, that the base station determines a physical hybrid automatic repeat request indicator channel PHICH resource includes: determining, by the base station, a PHICH group number $n\_u_{PHICH}^{group}$ of the physical hybrid automatic repeat request indicator channel PHICH resource and an orthogonal sequence number $n\_u_{PHICH}^{seq}$ in the PHICH group $n\_u_{PHICH}^{group}$.

Specifically, the base station determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are preset or are provided by the third party, without needing to receive information that is about the PHICH resource and that is sent by the base station.

It should be understood that the PHICH resource is uniquely determined by an index pair (index pair) $(n\_u_{PHICH}^{group}, n\_u_{PHICH}^{seq})$.

Optionally, the method further includes: sending, by the base station to the user equipment, the PHICH group number $n\_u_{PHICH}^{group}$ of the PHICH resource and the orthogonal sequence number $n\_u_{PHICH}^{seq}$ in the PHICH group $n\_u_{PHICH}^{group}$.

Specifically, after determining the PHICH group number $n\_u_{PHICH}^{group}$ of the PHICH resource and the orthogonal sequence number $n\_u_{PHICH}^{seq}$ in the PHICH group $n\_u_{PHICH}^{group}$, the base station sends the PHICH group number $n\_u_{PHICH}^{group}$ of the PHICH resource and the orthogonal sequence number $n\_u_{PHICH}^{seq}$ in the PHICH group $n\_u_{PHICH}^{group}$ to the user equipment. Therefore, the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are determined by the base station.

Optionally, that the base station determines a PHICH resource includes: determining, by the base station, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

Optionally, the determining, by the base station, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier includes:

determining, by the base station according to formulas $$n\_u_{PHICH}^{group} = \mathrm{mod}(LTE\text{-}U\_ID, N_{PHICH}^{group}) \quad (1)$$

and $$n\_u_{PHICH}^{seq} = \mathrm{mod}(LTE\text{-}U\_ID, N_{PHICH}^{seq}) \quad (2),$$

the PHICH group number $n\_u_{PHICH}^{group}$ of the PHICH resource and the orthogonal sequence number $n\_u_{PHICH}^{seq}$ in the PHICH group $n\_u_{PHICH}^{group}$, where mod( ) is a MOD function, LTE-U_ID is the LTE-U carrier identifier, $N_{PHICH}^{group}$ is a quantity of PHICH groups, and $N_{PHICH}^{seq}$ is a quantity of orthogonal sequences in each PHICH group.

Specifically, parameters in formulas (1) and (2) are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (1) and (2) by using the parameters that are preset or are provided by the third party, and therefore, does not need to receive a parameter sent by the base station.

Optionally, that the base station determines a PHICH resource includes:

determining, by the base station according to formulas $$n\_u_{PHICH}^{group} = \mathrm{mod}(I\_u + n\_u, N_{PHICH}^{group}) + I_{PHICH} \cdot N_{PHICH}^{group} \quad (3)$$

and $$n\_u_{PHICH}^{seq} = \mathrm{mod}(\lfloor I\_u / N_{PHICH}^{group} \rfloor + n\_u, 2N_{SF}^{PHICH}) \quad (4),$$

a PHICH group number $n\_u_{PHICH}^{group}$ of the PHICH resource and an orthogonal sequence number $n\_u_{PHICH}^{seq}$ in the PHICH group $n\_u_{PHICH}^{group}$, where mod( ) is a MOD function, $\lfloor \ \rfloor$ is a round-down function, $N_{PHICH}^{group}$ is a quantity of PHICH groups, a value of $I_{PHICH}$ is 0 or 1, $N_{SF}^{PHICH}$ is a PHICH spreading factor with a value of 2 or 4, and $n\_u$ and $I\_u$ are adjustment parameters with a value of zero or a positive integer.

Specifically, parameters in formulas (3) and (4) are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using the parameters that are preset or are provided by the third party, and therefore, does not need to receive a parameter sent by the base station.

Optionally, the method further includes: sending, by the base station, $n\_u$ and $I\_u$ to the user equipment, where $n\_u$ and $I\_u$ are adjustment parameters with a value of zero or a positive integer.

Specifically, after determining the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4), the base station sends $n\_u$ and $I\_u$ to the user equipment, so that the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using $n\_u$, $I\_u$, and another parameter that is preset or is provided by a third party.

Optionally, the LTE-U carrier information includes information used to indicate a time change of an LTE-U carrier or information used to indicate whether a signal is transmitted on an LTE-U carrier.

It should be understood that the LTE-U carrier information may include any information about the LTE-U carrier. This is not limited in this embodiment of the present invention.

Therefore, in this embodiment of the present invention, a broadcast channel such as a PHICH is used to indicate LTE-U carrier information. All user equipments can detect and receive the LTE-U carrier information indicated by the PHICH channel, and it is not required to send DCI signaling to each user equipment for transmitting LTE-U carrier information, thereby effectively reducing network signaling overheads.

The foregoing describes in detail the method for transmitting LTE-U carrier information according to this embodiment of the present invention from a perspective of the base station with reference to FIG. 1. The following describes in detail a method for transmitting LTE-U carrier information according to an embodiment of the present invention from a perspective of user equipment with reference to FIG. 2.

Figure 2:
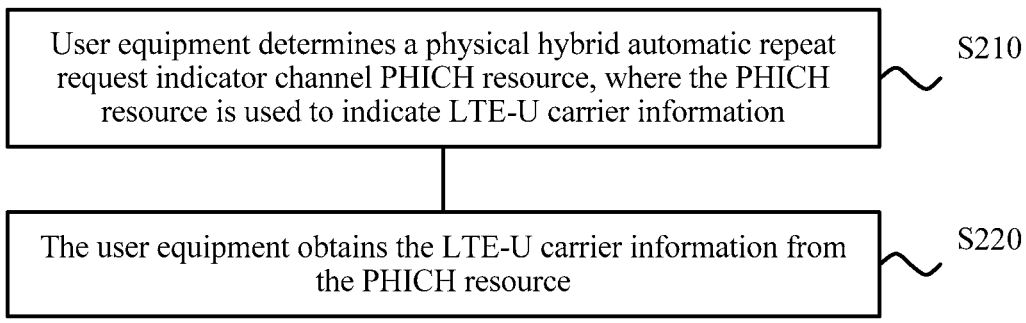
FIG. 2 is a schematic flowchart of a method for transmitting LTE-U carrier information according to another embodiment of the present invention.

FIG. 2 shows another method 200 for transmitting LTE-U carrier information according to an embodiment of the present invention. The method 200 includes the following steps:

S210. User equipment determines a physical hybrid automatic repeat request indicator channel PHICH resource, where the PHICH resource is used to indicate the LTE-U carrier information.

Specifically, the user equipment determines a PHICH resource that indicates LTE-U carrier information of the user equipment.

It should be understood that the user equipment may determine the PHICH resource by using multiple methods. This is not limited in this embodiment of the present invention.

S220. The user equipment obtains the LTE-U carrier information from the PHICH resource.

It should be understood that the user equipment may obtain the LTE-U carrier information by using multiple methods. This is not limited in this embodiment of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing describes in detail the method for transmitting LTE-U carrier information according to this embodiment of the present invention from a perspective of the user equipment with reference to FIG. 2.

The following describes this embodiment of the present invention in more detail with reference to a specific example. It should be noted that, the example in FIG. 2 is only intended to help a person skilled in the art understand the embodiments of the present invention rather than restricting the embodiments of the present invention to a specific numerical value or a specific scenario that is illustrated. Apparently, a person skilled in the art can perform various equivalent modifications or changes according to the example given in FIG. 2, and such modifications or changes also fall within the scope of the embodiments of the present invention.

According to this embodiment of the present invention, that user equipment determines a PHICH resource includes:

determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$.

Specifically, the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are preset or are provided by a third party, without needing to receive information that is about the PHICH resource and that is sent by a base station.

It should be understood that the PHICH resource is uniquely determined by an index pair (index pair) $(n\_u_{PHICH}^{group}, n\_u_{PHICH}^{seq})$.

Optionally, the method further includes: receiving, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ that are sent by a base station; and that user equipment determines a PHICH resource includes: determining, by the user equipment, the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are sent by the base station.

Specifically, the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are determined by the base station.

Optionally, that the user equipment determines a PHICH resource includes: determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

Optionally, the determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier includes: determining, by the user equipment, the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (1) and (2).

Specifically, parameters in formulas (1) and (2) are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (1) and (2) by using the parameters that are preset or are provided by the third party, and therefore, does not need to receive a parameter sent by a base station.

Optionally, that user equipment determines a PHICH resource includes:

determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (3) and (4).

Specifically, parameters in formulas (3) and (4) are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using the parameters that are preset or are provided by the third party, and therefore, does not need to receive a parameter sent by a base station.

Optionally, the method further includes: receiving, by the user equipment, $n\_u$ and $I\_u$ sent by a base station, where $n\_u$ and $I\_u$ are adjustment parameters with a value of zero or a positive integer; and that user equipment determines a PHICH resource includes: determining, by the user equipment, a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (3) and (4).

Specifically, the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using $n\_u$ and $I\_u$ that are received from the base station and another parameter that is preset or is provided by a third party.

Optionally, the LTE-U carrier information includes information used to indicate a time change of an LTE-U carrier or information used to indicate whether a signal is transmitted on an LTE-U carrier.

It should be understood that the LTE-U carrier information may include any information about the LTE-U carrier. This is not limited in this embodiment of the present invention.

Optionally, the method further includes: receiving, by the user equipment, a PHICH resource that indicates the LTE-U carrier information and that is sent by the base station.

Specifically, the user equipment receives the PHICH resource that indicates the LTE-U carrier information of the user equipment and that is sent by the base station.

Therefore, in this embodiment of the present invention, a broadcast channel such as a PHICH is used to indicate LTE-U carrier information. All user equipments can detect and receive the LTE-U carrier information indicated by the PHICH channel, and it is not required to send DCI signaling to each user equipment for transmitting LTE-U carrier information, thereby effectively reducing network signaling overheads.

The foregoing describes in detail the method for transmitting LTE-U carrier information according to the embodiments of the present invention with reference to FIG. 1 and FIG. 2. The following describes in detail a base station and user equipment according to embodiments of the present invention with reference to FIG. 3 to FIG. 6.

Figure 3:
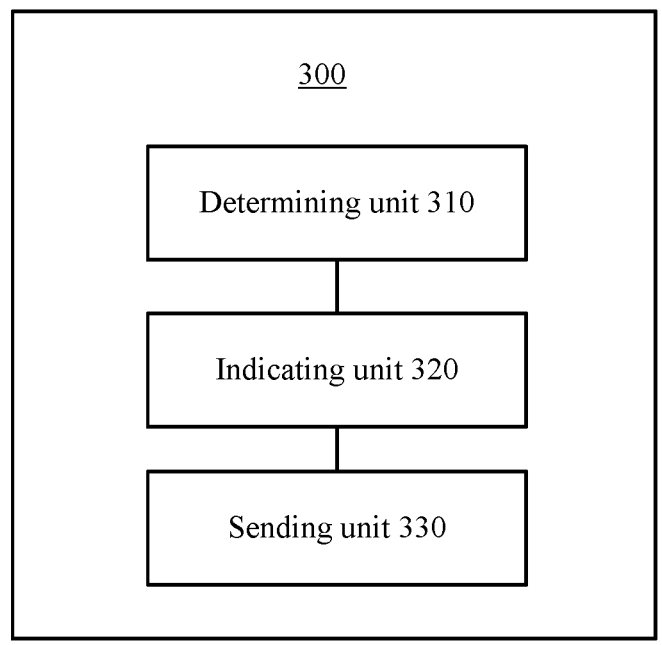
FIG. 3 is a schematic block diagram of a base station according to an embodiment of the present invention.

FIG. 3 shows a schematic block diagram of a base station 300 according to an embodiment of the present invention. As shown in FIG. 3, the base station 300 includes a determining unit 310, an indicating unit 320, and a sending unit 330.

The determining unit 310 is configured to determine a physical hybrid automatic repeat request indicator channel PHICH resource.

In a wireless communications system, for example, an LTE system, a physical hybrid automatic repeat request indicator channel (English full name: Physical Hybrid ARQ Indicator Channel, PHICH for short) is a broadcast channel, and user equipment in the wireless communications system can detect and receive information carried on the PHICH channel.

It should be understood that the determining unit 310 may determine the PHICH resource by using multiple methods. This is not limited in this embodiment of the present invention.

The indicating unit 320 is configured to use the PHICH resource to indicate Long Term Evolution in unlicensed spectrum LTE-U carrier information.

Specifically, the indicating unit 320 uses the PHICH resource to separately indicate LTE-U carrier information of multiple user equipments.

It should be understood that the indicating unit 320 may use, by using multiple methods, the PHICH resource to indicate the Long Term Evolution in unlicensed spectrum LTE-U carrier information. This is not limited in the embodiments of the present invention.

The sending unit 330 is configured to send user equipment the PHICH resource that indicates the LTE-U carrier information.

Specifically, the sending unit 330 separately sends the multiple user equipments the PHICH resource that indicates the LTE-U carrier information of the multiple user equipments.

It should be understood that the sending unit 330 may send, by using multiple methods, the user equipment the PHICH resource that indicates the LTE-U carrier information. This is not limited in this embodiment of the present invention.

The foregoing describes in detail the base station 300 according to this embodiment of the present invention with reference to FIG. 3.

The following describes this embodiment of the present invention in more detail with reference to a specific example. It should be noted that, the example in FIG. 3 is only intended to help a person skilled in the art understand the embodiments of the present invention rather than restricting the embodiments of the present invention to a specific numerical value or a specific scenario that is illustrated. Apparently, a person skilled in the art can perform various equivalent modifications or changes according to the example given in FIG. 3, and such modifications or changes also fall within the scope of the embodiments of the present invention.

According to this embodiment of the present invention, the determining unit 310 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$.

Specifically, the determining unit 310 determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are preset or are provided by the third party, without needing to receive information that is about the PHICH resource and that is sent by the base station.

It should be understood that the PHICH resource is uniquely determined by an index pair (index pair) ($n\_u_{PHICH}^{group}, n\_u_{PHICH}^{seq}$).

Optionally, the sending unit 330 is further configured to send the user equipment the PHICH group number $n\_u_{PHICH}^{group}$ of the PHICH resource and the orthogonal sequence number $n\_u_{PHICH}^{seq}$ in the PHICH group $n\_u_{PHICH}^{group}$.

Specifically, after the base station determines the PHICH group number $n\_u_{PHICH}^{group}$ of the PHICH resource and the orthogonal sequence number $n\_u_{PHICH}^{seq}$ in the PHICH group $n\_u_{PHICH}^{group}$, the sending unit 330 sends the PHICH group number $n\_u_{PHICH}^{group}$ of the PHICH resource and the orthogonal sequence number $n\_u_{PHICH}^{seq}$ in the PHICH group $n\_u_{PHICH}^{group}$ to the user equipment. Therefore, the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are determined by the base station.

Optionally, the determining unit 310 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

Optionally, the determining unit 310 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (1) and (2).

Specifically, parameters in formulas (1) and (2) are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (1) and (2) by using the parameters that are preset or are provided by the third party, and therefore, does not need to receive a parameter sent by the base station.

Optionally, the determining unit 310 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (3) and (4).

Specifically, parameters in formulas (3) and (4) are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using the parameters that are preset or are provided by the third party, and therefore, does not need to receive a parameter sent by the base station.

Optionally, the sending unit 330 is further configured to send n_u and I_u to the user equipment, where n_u and I_u are adjustment parameters with a value of zero or a positive integer.

Specifically, after the base station determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4), the sending unit 330 sends n_u and I_u to the user equipment, so that the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using n_u, I_u, and another parameter that is preset or is provided by a third party.

Therefore, in this embodiment of the present invention, a broadcast channel such as a PHICH is used to indicate LTE-U carrier information. All user equipments can detect and receive the LTE-U carrier information indicated by the PHICH channel, and it is not required to send DCI signaling to each user equipment for transmitting LTE-U carrier information, thereby effectively reducing network signaling overheads.

Figure 4:
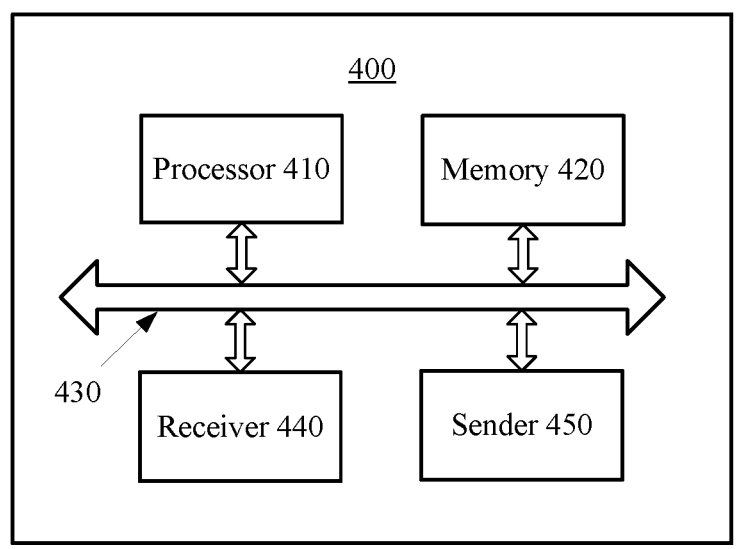
FIG. 4 is a schematic block diagram of a base station according to another embodiment of the present invention.

In another implementation manner, as shown in FIG. 4, an embodiment of the present invention further provides a base station 400. The base station 400 includes a processor 410, a memory 420, a bus system 430, a receiver 440, and a transmitter 450. The processor 410, the memory 420, the receiver 440, and the transmitter 450 are connected by using the bus system 430. The memory 420 is configured to store an instruction. The processor 410 is configured to execute the instruction stored in the memory 420, to control the receiver 440 to receive a signal, an instruction, or a message, and control the transmitter 450 to send a signal, signaling, or a message. The processor 410 is configured to determine a physical hybrid automatic repeat request indicator channel PHICH resource, and use the PHICH resource to indicate Long Term Evolution in unlicensed spectrum LTE-U carrier information. The transmitter 450 is configured to send user equipment the PHICH resource that indicates the LTE-U carrier information.

The foregoing describes in detail the base station 400 according to this embodiment of the present invention with reference to FIG. 4.

The following describes this embodiment of the present invention in more detail with reference to a specific example. It should be noted that, the example in FIG. 4 is only intended to help a person skilled in the art understand the embodiments of the present invention rather than restricting the embodiments of the present invention to a specific numerical value or a specific scenario that is illustrated. Apparently, a person skilled in the art can perform various equivalent modifications or changes according to the example given in FIG. 4, and such modifications or changes also fall within the scope of the embodiments of the present invention.

According to this embodiment of the present invention, the processor 410 is specifically configured to determine a PHICH group number $n\_u_{PHICH}^{group}$ of the physical hybrid automatic repeat request indicator channel PHICH resource and an orthogonal sequence number $n\_u_{PHICH}^{seq}$ in the PHICH group $n\_u_{PHICH}^{group}$.

Specifically, the processor 410 determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group PHICH that are preset or are provided by the third party, without needing to receive information that is about the PHICH resource and that is sent by the base station.

It should be understood that the PHICH resource is uniquely determined by an index pair (index pair) ($n\_u_{PHICH}^{group}$, $n\_u_{PHICH}^{seq}$).

Optionally, the transmitter 450 sends the user equipment the PHICH group number $n\_u_{PHICH}^{group}$ of the PHICH resource and the orthogonal sequence number $n\_u_{PHICH}^{seq}$ in the PHICH group $n\_u_{PHICH}^{group}$.

Specifically, after the base station determines the PHICH group number $n\_u_{PHICH}^{group}$ of the PHICH resource and the orthogonal sequence number $n\_u_{PHICH}^{seq}$ in the PHICH group $n\_u_{PHICH}^{group}$, the transmitter 450 sends the PHICH group number $n\_u_{PHICH}^{group}$ of the PHICH resource and the orthogonal sequence number $n\_u_{PHICH}^{seq}$ in the PHICH group $n\_u_{PHICH}^{group}$ to the user equipment. Therefore, the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are determined by the base station.

Optionally, the processor 410 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

Optionally, the processor 410 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (1) and (2).

Specifically, parameters in formulas (1) and (2) are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (1) and (2) by using the parameters that are preset or are provided by the third party, and therefore, does not need to receive a parameter sent by the base station.

Optionally, the processor 410 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (3) and (4).

Specifically, parameters in formulas (3) and (4) are preset or are provided by a third party.

Therefore, the user equipment may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using the parameters that are preset or are provided by the third party, and therefore, does not need to receive a parameter sent by the base station.

Optionally, the transmitter 450 sends n_u and I_u to the user equipment, where n_u and I_u are adjustment parameters with a value of zero or a positive integer.

Specifically, after the base station determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4), the transmitter 450 sends n_u and I_u to the user equipment, so that the user equipment determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using n_u, I_u, and another parameter that is preset or is provided by a third party.

Therefore, in this embodiment of the present invention, a broadcast channel such as a PHICH is used to indicate LTE-U carrier information. All user equipments can detect and receive the LTE-U carrier information indicated by the PHICH channel, and it is not required to send DCI signaling to each user equipment for transmitting LTE-U carrier information, thereby effectively reducing network signaling overheads.

It should be understood that, in this embodiment of the present invention, the processor 410 may be a central processing unit (Central Processing Unit, "CPU" for short), or the processor 410 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 420 may include a read-only memory and a random access memory, and provide an instruction and data to the processor 410. A part of the memory 420 may further include a non-volatile random access memory. For example, the memory 420 may further store device type information.

In addition to a data bus, the bus system 430 may include a power bus, a control bus, and a status signal bus. However, for clear description, various buses are all marked as the bus system 430 in the figure.

In an implementation process, the steps of the foregoing method may be completed by using a hardware integrated logic circuit or an instruction in a form of software in the processor 410. The steps of the method disclosed with reference to the embodiments of the present invention may be directly embodied as being performed and completed by a hardware processor, or being performed and completed by a combination of hardware and software modules in the processor. The software module may be located in a mature storage medium in the art, such as a random memory, a flash memory, a read-only memory, a programmable read-only memory or an electrically erasable programmable memory, or a register. The storage medium is located in the memory 420, and the processor 410 reads information in the memory 420 and completes the steps of the foregoing method in combination with hardware of the processor 410. To avoid repetition, details are not described herein.

It should be understood that the base station 300 and the base station 400 according to the embodiments of the present invention may correspond to the base station in the method for transmitting LTE-U carrier information according to the embodiments of the present invention. In addition, the foregoing and other operations and/or functions of the modules in the base station 300 and the base station 400 are separately used to implement corresponding processes of the method in FIG. 1. For brevity, details are not described herein.

In addition, a computer-readable medium (or medium) is further provided, including a computer-readable instruction. When the computer-readable instruction is executed, operations of steps S110 to S130 in the method in the foregoing embodiment are performed.

Moreover, a computer program product is further provided, including the foregoing computer-readable medium.

The foregoing describes in detail the base station according to the embodiments of the present invention with reference to FIG. 3 and FIG. 4. The following describes user equipment according to embodiments of the present invention with reference to FIG. 5 and FIG. 6.

Figure 5:
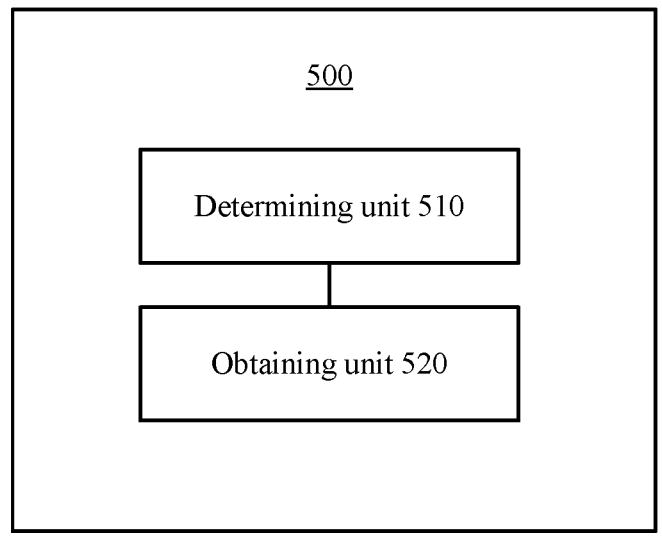
FIG. 5 is a schematic block diagram of user equipment according to an embodiment of the present invention.

FIG. 5 shows a schematic block diagram of user equipment 500 according to an embodiment of the present invention. As shown in FIG. 5, the user equipment 500 includes a determining unit 510 and an obtaining unit 520.

The determining unit 510 is configured to determine a physical hybrid automatic repeat request indicator channel PHICH resource, where the PHICH resource is used to indicate LTE-U carrier information.

Specifically, the determining unit 510 determines a PHICH resource that indicates LTE-U carrier information of the user equipment.

It should be understood that the determining unit 510 may determine the PHICH resource by using multiple methods. This is not limited in this embodiment of the present invention.

The obtaining unit 520 is configured to obtain the LTE-U carrier information from the PHICH resource.

It should be understood that the obtaining unit 520 may obtain the LTE-U carrier information by using multiple methods. This is not limited in this embodiment of the present invention.

The foregoing describes in detail the user equipment according to this embodiment of the present invention with reference to FIG. 5.

The following describes this embodiment of the present invention in more detail with reference to a specific example. It should be noted that, the example in FIG. 5 is only intended to help a person skilled in the art understand the embodiments of the present invention rather than restricting the embodiments of the present invention to a specific numerical value or a specific scenario that is illustrated. Apparently, a person skilled in the art can perform various equivalent modifications or changes according to the example given in FIG. 5, and such modifications or changes also fall within the scope of the embodiments of the present invention.

According to this embodiment of the present invention, the determining unit 510 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$.

Specifically, the determining unit 510 determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are preset or are provided by a third party, without needing to receive information that is about the PHICH resource and that is sent by a base station.

It should be understood that the PHICH resource is uniquely determined by an index pair (index pair) ($n\_u_{PHICH}^{group}, n\_u_{PHICH}^{seq}$).

Optionally, the user equipment 500 further includes a first receiving unit, configured to receive a PHICH group number $n\_u_{PHICH}^{group}$ of the PHICH resource and an orthogonal sequence number $n\_u_{PHICH}^{seq}$ in the PHICH group $n\_u_{PHICH}^{group}$ that are sent by a base station; and the determining unit 510 is specifically configured to determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are sent by the base station.

Specifically, the determining unit 510 determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are determined by the base station.

Optionally, the determining unit 510 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

Optionally, the determining unit 510 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (1) and (2).

Specifically, parameters in formulas (1) and (2) are preset or are provided by a third party.

Therefore, the determining unit 510 may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (1) and (2) by using the parameters that are preset or are provided by the third party, and therefore, does not need to receive a parameter sent by a base station.

Optionally, the determining unit 510 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (3) and (4).

Specifically, parameters in formulas (3) and (4) are preset or are provided by a third party.

Therefore, the determining unit 510 may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using the parameters that are preset or are provided by the third party, and therefore, does not need to receive a parameter sent by a base station.

Optionally, the user equipment 500 further includes a second receiving unit, configured to receive n_u and I_u sent by a base station, where n_u and I_u are adjustment parameters with a value of zero or a positive integer; and the determining unit 510 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (3) and (4).

Specifically, the determining unit 510 determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using n_u and I_u that are received from the base station and another parameter that is preset or is provided by a third party.

Optionally, the user equipment 500 further includes a third receiving unit, configured to receive a PHICH resource that indicates the LTE-U carrier information and that is sent by the base station.

Specifically, the third receiving unit receives the PHICH resource that indicates the LTE-U carrier information of the user equipment and that is sent by the base station.

Therefore, in this embodiment of the present invention, a broadcast channel such as a PHICH is used to indicate LTE-U carrier information. All user equipments can detect and receive the LTE-U carrier information indicated by the PHICH channel, and it is not required to send DCI signaling to each user equipment for transmitting LTE-U carrier information, thereby effectively reducing network signaling overheads.

Figure 6:
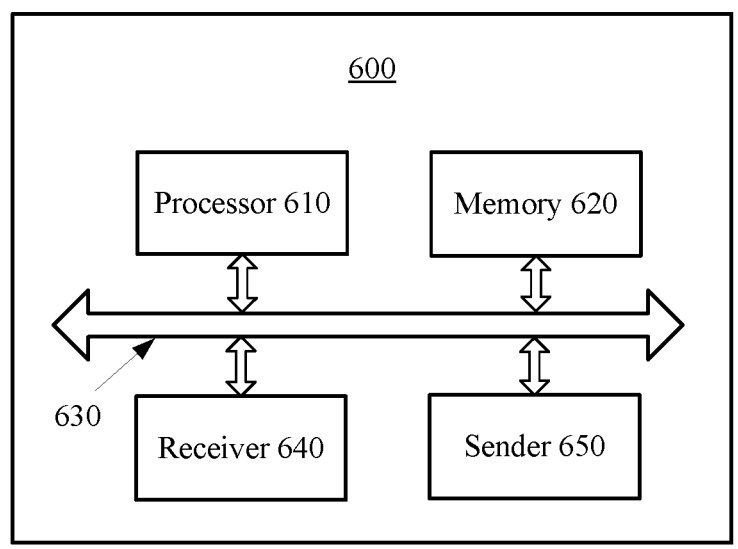
FIG. 6 is a schematic block diagram of user equipment according to another embodiment of the present invention.

In another implementation manner, as shown in FIG. 6, an embodiment of the present invention further provides user equipment 600. The user equipment 600 includes a processor 610, a memory 620, a bus system 630, a receiver 640, and a transmitter 650. The processor 610, the memory 620, the receiver 640, and the transmitter 650 are connected by using the bus system 630. The memory 620 is configured to store an instruction. The processor 610 is configured to execute the instruction stored in the memory 620, to control the receiver 640 to receive a signal, an instruction, or a message, and control the transmitter 650 to send a signal, an instruction, or a message. The processor 610 is configured to: determine a physical hybrid automatic repeat request indicator channel PHICH resource, where the PHICH resource is used to indicate LTE-U carrier information; and obtain the LTE-U carrier information from the PHICH resource.

The foregoing describes in detail the user equipment according to this embodiment of the present invention with reference to FIG. 6.

The following describes this embodiment of the present invention in more detail with reference to a specific example. It should be noted that, the example in FIG. 6 is only intended to help a person skilled in the art understand the embodiments of the present invention rather than restricting the embodiments of the present invention to a specific numerical value or a specific scenario that is illustrated. Apparently, a person skilled in the art can perform various equivalent modifications or changes according to the example given in FIG. 6, and such modifications or changes also fall within the scope of the embodiments of the present invention.

According to this embodiment of the present invention, the processor 610 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$.

Specifically, the processor 610 determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are preset or are provided by a third party, without needing to receive information that is about the PHICH resource and that is sent by a base station.

It should be understood that the PHICH resource is uniquely determined by an index pair (index pair) ($n\_u_{PHICH}^{group}$, $n\_u_{PHICH}^{seq}$).

Optionally, the receiver 640 receives a PHICH group number $n\_u_{PHICH}^{group}$ of the PHICH resource and an orthogonal sequence number $n\_u_{PHICH}^{seq}$ in the PHICH group $n\_u_{PHICH}^{group}$ that are sent by a base station; and the processor 610 is specifically configured to determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are sent by the base station.

Specifically, the processor 610 determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are determined by the base station.

Optionally, the processor 610 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to an LTE-U carrier identifier.

Optionally, the processor 610 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (1) and (2).

Specifically, parameters in formulas (1) and (2) are preset or are provided by a third party.

Therefore, the processor 610 may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (1) and (2) by using the parameters that are preset or are provided by the third party, and therefore, does not need to receive a parameter sent by a base station.

Optionally, the processor 610 is specifically configured to determine a PHICH group number $n\_u_{PHICH}^{group}$ of the physical hybrid automatic repeat request indicator channel PHICH resource and an orthogonal sequence number $n\_u_{PHICH}^{seq}$ in the PHICH group $n\_u_{PHICH}^{group}$ according to formulas (3) and (4).

Specifically, parameters in formulas (3) and (4) are preset or are provided by a third party.

Therefore, the processor 610 may determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using the parameters that are preset or are provided by the third party, and therefore, does not need to receive a parameter sent by a base station.

Optionally, the receiver 640 is further configured to receive n_u and I_u sent by a base station, where n_u and I_u are adjustment parameters with a value of zero or a positive integer; and the processor 610 is specifically configured to determine a PHICH group number $n\_u_{PHICH}^{group}$ of the PHICH resource and an orthogonal sequence number $n\_u_{PHICH}^{seq}$ in the PHICH group $n\_u_{PHICH}^{group}$ according to formulas (3) and (4).

Specifically, the processor 610 determines the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to formulas (3) and (4) by using n_u and I_u that are received from the base station and another parameter that is preset or is provided by a third party.

Optionally, the receiver 640 is further configured to receive a PHICH resource that indicates the LTE-U carrier information and that is sent by the base station.

Therefore, in this embodiment of the present invention, a broadcast channel such as a PHICH is used to indicate LTE-U carrier information. All user equipments can detect and receive the LTE-U carrier information indicated by the PHICH channel, and it is not required to send DCI signaling to each user equipment for transmitting LTE-U carrier information, thereby effectively reducing network signaling overheads.

It should be understood that, in this embodiment of the present invention, the processor 610 may be a central processing unit (Central Processing Unit, "CPU" for short), or the processor 610 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 620 may include a read-only memory and a random access memory, and provide an instruction and data to the processor 610. A part of the memory 620 may further include a non-volatile random access memory. For example, the memory 620 may further store device type information.

In addition to a data bus, the bus system 630 may include a power bus, a control bus, and a status signal bus. However, for clear description, various buses are all marked as the bus system 630 in the figure.

In an implementation process, the steps of the foregoing method may be completed by using a hardware integrated logic circuit or an instruction in a form of software in the processor 610. The steps of the method disclosed with reference to the embodiments of the present invention may be directly embodied as being performed and completed by a hardware processor, or being performed and completed by a combination of hardware and software modules in the processor. The software module may be located in a mature storage medium in the art, such as a random memory, a flash memory, a read-only memory, a programmable read-only memory or an electrically erasable programmable memory, or a register. The storage medium is located in the memory 620, and the processor 610 reads information in the memory 620 and completes the steps of the foregoing method in combination with hardware of the processor 610. To avoid repetition, details are not described herein.

It should be further understood that, the user equipment 500 and the user equipment 600 according to the embodiments of the present invention may correspond to the user equipment in the method for transmitting LTE-U carrier information according to the embodiments of the present invention. In addition, the foregoing and other operations and/or functions of the modules in the user equipment 500 and the user equipment 600 are separately used to implement corresponding processes of the method in FIG. 2. For brevity, details are not described herein.

In addition, a computer-readable medium (or medium) is further provided, including a computer-readable instruction. When the computer-readable instruction is executed, operations of steps S210 to S220 in the method in the foregoing embodiment are performed.

Moreover, a computer program product is further provided, including the foregoing computer-readable medium.

It should be noted that signaling mentioned in this specification includes but is not limited to an instruction, information, a signal, or a message. This is not limited herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, performed by a base station, for transmitting Long Term Evolution in unlicensed spectrum (LTE-U) carrier information simultaneously to multiple user equipment (UE) devices in a wireless communication system, the method comprising:
   determining a physical hybrid automatic repeat request indicator channel (PHICH) resource to be used by the base station to broadcast the LTE-U carrier information;
   using the PHICH resource to broadcast the LTE-U carrier information; and
   sending, to the multiple UE devices, an identifier of the PHICH resource that the base station uses to transmit the LTE-U carrier information.

2. The method according to claim 1, wherein the determining the PHICH resource comprises: determining a PHICH group number $n\_u_{PHICH}^{group}$ of the PHICH resource and an orthogonal sequence number $n\_u_{PHICH}^{seq}$ in a PHICH group $n\_u_{PHICH}^{group}$.

3. The method according to claim 2, further comprising:
   sending, to the UE devices, the PHICH group number $n\_u_{PHICH}^{group}$ of the PHICH resource and the orthogonal sequence number $n\_u_{PHICH}^{seq}$ in the PHICH group $n\_u_{PHICH}^{group}$.

4. The method according to claim 1, wherein the determining the PHICH resource comprises: determining a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to an LTE-U carrier identifier.

5. The method according to claim 1, wherein the determining the PHICH resource comprises: determining a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to formulas $n\_u_{PHICH}^{group} = \mod(LTE\text{-}U\_ID, N_{PHICH}^{group})$ and $n\_u_{PHICH}^{seq} = \mod(LTE\text{-}U\_ID, N_{PHICH}^{seq})$, wherein mod( ) is a MOD function, LTE-U_ID is an LTE-U carrier identifier, $N_{PHICH}^{group}$ is a quantity of PHICH groups, and $N_{PHICH}^{seq}$ is a quantity of orthogonal sequences in each PHICH group.

6. The method according to claim 1, wherein the determining the PHICH resource comprises: determining a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to formulas $n\_u_{PHICH}^{group} = \mod(I\_u + n\_u, N_{PHICH}^{group}) + I_{PHICH} N_{PHICH}^{group}$ and $n\_u_{PHICH}^{seq} = \mod(\lfloor I\_u / N_{PHICH}^{group} \rfloor + n\_u, 2N_{SF}^{PHICH})$, wherein mod( ) is a MOD function, $\lfloor \ \rfloor$ is a round-down function, $N_{PHICH}^{group}$ is a quantity of PHICH groups, a value of $I_{PHICH}$ is 0 or 1, $N_{SF}^{PHICH}$ is a PHICH spreading factor with a value of 2 or 4, and n_u and I_u are adjustment parameters with a value of zero or a positive integer.

7. A base station, comprising:
   a non-transitory computer readable medium having instructions stored thereon; and
   a computer processor coupled to the non-transitory computer readable medium and configured to execute the instructions to perform a method for transmitting Long Term Evolution in unlicensed spectrum (LTE-U) carrier information simultaneously to multiple user equipment (UE) devices in a wireless communication system, the method comprising:
   determining a physical hybrid automatic repeat request indicator channel (PHICH) resource to be used by the base station to broadcast the LTE-U carrier information;
   using the PHICH resource to broadcast the LTE-U carrier information; and
   sending, to the multiple UE device, an identifier of the PHICH resource that the base station uses to transmit the LTE-U carrier information.

8. The base station according to claim 7, wherein the computer processor is further configured to execute the instructions to:
   determine a PHICH group number $n\_u_{PHICH}^{group}$ of the PHICH resource and an orthogonal sequence number $n\_u_{PHICH}^{seq}$ in a PHICH group $n\_u_{PHICH}^{seq}$.

9. The base station according to claim 8, comprising:
   a transmitter configured to send the UE devices the PHICH group number $n\_u_{PHICH}^{group}$ of the PHICH resource and the orthogonal sequence number $n\_u_{PHICH}^{seq}$ in the PHICH group $n\_u_{PHICH}^{group}$.

10. The base station according to claim 7, wherein the computer processor is further configured to execute the instructions to:
    determine a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to an LTE-U carrier identifier.

11. The base station according to claim 7, wherein the computer processor is further configured to execute the instructions to:
    determine a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to formulas $n\_u_{PHICH}^{group} = \mod(LTE\_U\_ID, N_{PHICH}^{group})$ and $n\_u_{PHICH}^{seq} = \mod(LTE\_U\_ID, N_{PHICH}^{seq})$, wherein mod ( ) is a MOD function, LTE-U_ID is an LTE-U carrier identifier, $N_{PHICH}^{group}$ is a quantity of PHICH groups, and $N_{PHICH}^{seq}$ is a quantity of orthogonal sequences in each PHICH group.

12. The base station according to claim 7, wherein the computer processor is further configured to execute the instructions to determine a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to formulas $n\_u_{PHICH}^{group} = \mod(I\_u+n\_u, N_{PHICH}^{group}) + I_{PHICH} N_{PHICH}^{group}$ and $n\_u_{PHICH}^{seq} = \mod(\lfloor I\_u/N_{PHICH}^{group} \rfloor + n\_u, 2N_{SF}^{PHICH})$, wherein mod ( ) is a MOD function, $\lfloor \ \rfloor$ is a round-down function, $N_{PHICH}^{group}$ is a quantity of PHICH groups, a value of $I_{PHICH}$ is 0 or 1, $N_{SF}^{PHICH}$ is a PHICH spreading factor with a value of 2 or 4, and n_u and I_u are adjustment parameters with a value of zero or a positive integer.

13. The base station according to claim 12, comprising:
    a transmitter, configured to send n_u and I_u to the UE devices.

14. A user equipment, comprising:
    a non-transitory computer readable medium having instructions stored thereon; and
    a computer processor coupled to the non-transitory computer readable medium and configured to execute the instructions to perform a method for receiving, from a base station, broadcast Long Term Evolution in unlicensed spectrum (LTE-U) carrier information simultaneously with other ones of multiple user equipment (UE) devices in a wireless communication system, the method comprising:
    determining, a physical hybrid automatic repeat request indicator channel (PHICH) resource, wherein the PHICH resource is used by the base station to broadcast the LTE-U carrier information; and
    obtaining, via the PHICH resource, the LTE-U carrier information broadcast by the base station via the PHICH resource.

15. The user equipment according to claim 14, wherein the computer processor is further configured to execute the instructions to:
    determine a PHICH group number $n\_u_{PHICH}^{group}$ of the PHICH resource and an orthogonal sequence number $n\_u_{PHICH}^{seq}$ in a PHICH group $n\_u_{PHICH}^{group}$.

16. The user equipment according to claim 14, further comprising:
    a receiver, configured to receive a PHICH group number $n\_u_{PHICH}^{group}$ of the PHICH resource and an orthogonal sequence number $n\_u_{PHICH}^{seq}$ in a PHICH group $n\_u_{PHICH}^{group}$ that are sent by a base station, wherein the computer processor is further configured to execute the instructions to:
    determine the PHICH group number $n\_u_{PHICH}^{group}$ of the PHICH resource and the orthogonal sequence number $n\_u_{PHICH}^{seq}$ in the PHICH group $n\_u_{PHICH}^{group}$ according to the PHICH group number $n\_u_{PHICH}^{group}$ of the PHICH resource and the orthogonal sequence number $n\_u_{PHICH}^{seq}$ in the PHICH group $n\_u_{PHICH}^{group}$ that are sent by the base station.

17. The user equipment according to claim 14, wherein the computer processor is further configured to execute the instructions to:
    determine a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to an LTE-U carrier identifier.

18. The user equipment according to claim 14, wherein the computer processor is further configured to execute the instructions to:
    determine a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to formulas $n\_u_{PHICH}^{group} = \mod(LTE\_U\_ID, N_{PHICH}^{group})$ and $n\_u_{PHICH}^{seq} = \mod(LTE\_U\_ID, N_{PHICH}^{seq})$, wherein mod ( ) is a MOD function, LTE-U_ID is an LTE-U carrier identifier, $N_{PHICH}^{group}$ is a quantity of PHICH groups, and $N_{PHICH}^{seq}$ is a quantity of orthogonal sequences in each PHICH group.

19. The user equipment according to claim 14, wherein the computer processor is further configured to execute the instructions to: determine a PHICH group number $n\_u_{PHICH}^{group}$ of the physical hybrid automatic repeat request indicator channel PHICH resource and an orthogonal sequence number $n\_u_{PHICH}^{seq}$ in a PHICH group $n\_u_{PHICH}^{group}$ according to formulas $n\_u_{PHICH}^{group} = \mod(I\_u+n\_u, N_{PHICH}^{group}) + I_{PHICH} N_{PHICH}^{group}$ and $n\_$ $u_{PHICH}^{seq} = \text{mod}(\lfloor I\_u/N_{PHICH}^{group} \rfloor + n\_u, 2N_{SF}^{PHICH})$, wherein mod ( ) is a MOD function, $\lfloor \ \rfloor$ is a round-down function, $N_{PHICH}^{group}$ is a quantity of PHICH groups, a value of $I_{PHICH}$ is 0 or 1, $N_{SF}^{PHICH}$ is a PHICH spreading factor with a value of 2 or 4, and n_u and I_u are adjustment parameters with a value of zero or a positive integer.

20. The user equipment according to claim 14, further comprising:

a receiver, configured to receive n_u and I_u sent by a base station, wherein n_u and I_u are adjustment parameters with a value of zero or a positive integer, wherein the computer processor is further configured to execute the instructions to:

determine a PHICH group number $n\_u_{PHICH}^{group}$ of the PHICH resource and an orthogonal sequence number $n\_u_{PHICH}^{seq}$ in a PHICH group $n\_u_{PHICH}^{group}$ according to formulas $n\_u_{PHICH}^{group} = \text{mod}(I\_u+n\_u, N_{PHICH}^{group}) + I_{PHICH} N_{PHICH}^{group}$ and $n\_u_{PHICH}^{seq} = \text{mod}(\lfloor I\_u/N_{PHICH}^{group} \rfloor + n\_u, 2N_{SF}^{PHICH})$, wherein mod ( ) is a MOD function, $\lfloor \ \rfloor$ is a round-down function, $N_{PHICH}^{group}$ is a quantity of PHICH groups, a value of $I_{PHICH}$ is 0 or 1, and $N_{SF}^{PHICH}$ is a PHICH spreading factor with a value of 2 or 4.

\* \* \* \* \*